Patented June 3, 1924.

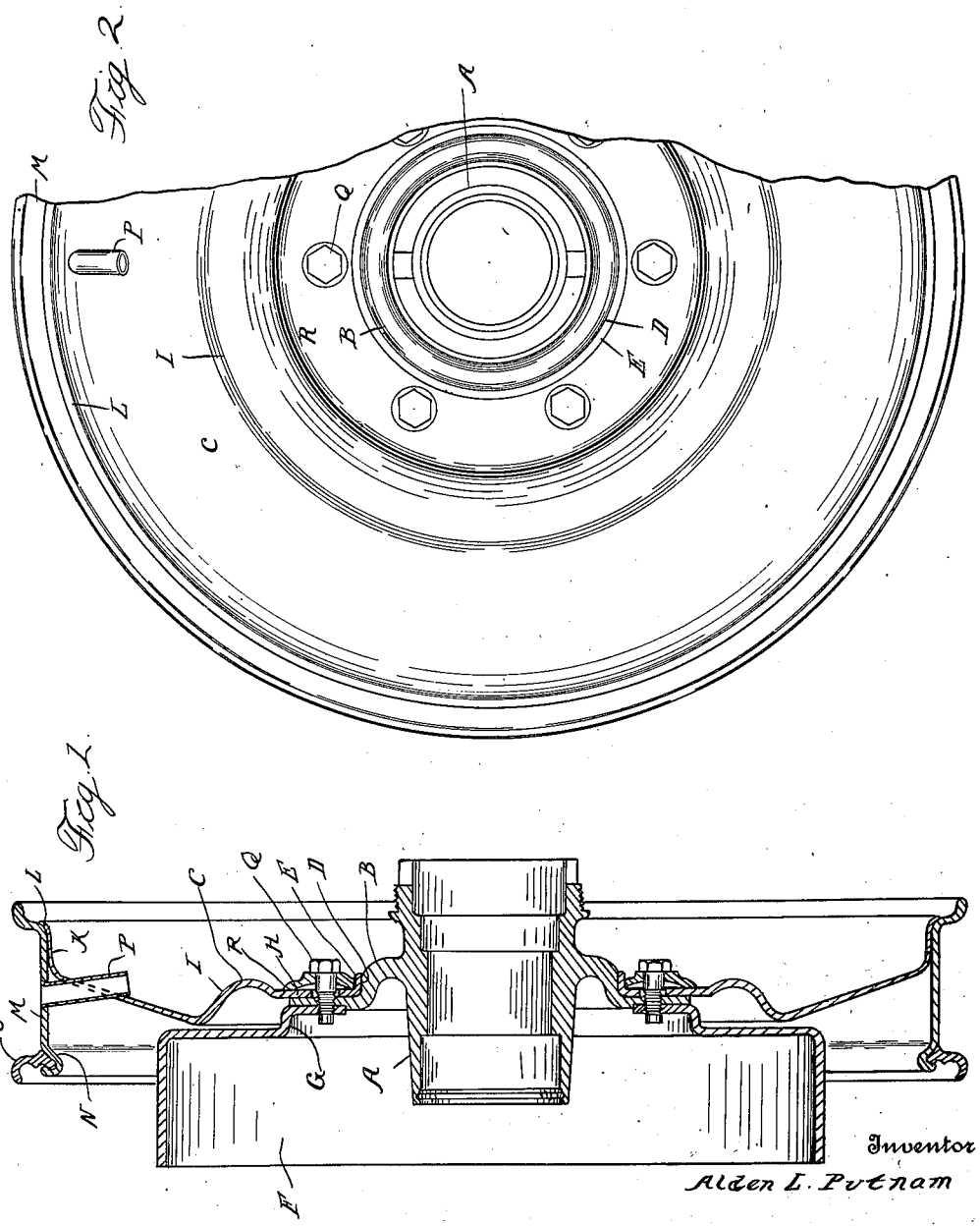

1,496,019

UNITED STATES PATENT OFFICE.

ALDEN L. PUTNAM, OF DETROIT, MICHIGAN, ASSIGNOR TO DETROIT PRESSED STEEL COMPANY, OF WILMINGTON, DELAWARE, A CORPORATION OF DELAWARE.

DISK WHEEL.

Application filed April 3, 1922. Serial No. 549,133.

*To all whom it may concern:*

Be it known that I, ALDEN L. PUTNAM, a citizen of the United States of America, residing at Detroit, in the county of Wayne and State of Michigan, have invented certain new and useful Improvements in Disk Wheels, of which the following is a specification, reference being had therein to the accompanying drawings.

The invention relates to disk wheels of the type formed from pressed sheet metal and provided with a dished portion which crosses the plane of impact. It is the object of the present invention to obtain various advantages, among which are: first, that the tire inflation tube is accessible from the outside of the wheel; second, the dishing of the disk is inward from its point of attachment to the rim; third, the dishing is sufficient to secure the desired lateral stability in the wheel with a relatively light gauge of metal and at the same time interference with the brake drum, or any other part of the wheel, is avoided; fourth, the formation of a mud pocket between the rim and disk is avoided; fifth, the rim may be of standard construction, such, for instance, as used for demountable rims; sixth, the disk is adapted to cooperate with such standard construction of rim so as to greatly reinforce and strengthen the same; seventh, where the rim is provided with a detachable flange, this is so arranged with respect to the disk as to be on the inside of the wheel; eighth, the reinforcement formed by the channel section, which receives the detachable flange, is arranged on the opposite side of the rim from that to which the disk is attached, whereby a balanced reinforcement is obtained. With these and other objects in view, the invention consists in the construction as hereinafter set forth.

In the drawings:

Figure 1 is a cross-section through the wheel in the plane of the axis;

Figure 2 is a side elevation thereof;

Figure 3:
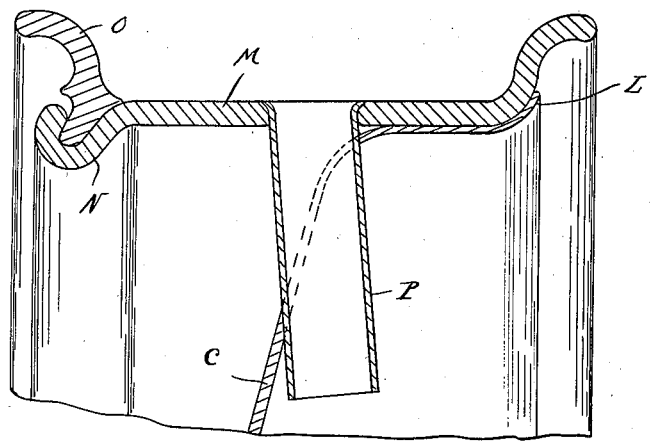
Figure 3 is an enlarged view of the rim and disk in the plane of the tire inflation tube.

In the construction of disk wheels for use on automobiles, or similar vehicles, it is important to combine strength and stability with relatively light weight and sufficient resiliency to yield to and recover from road shocks. This is generally obtained by using relatively light gauge metal, which is dished to stiffen the same and is preferably of tapering cross-section to more equally distribute the stresses. The dishing of the disk increases the total width thereof and requires a disposition within the rim so as not to interfere with other parts, such as the brake drum. Thus it is the usual practice to attach the disk to the rim at one side of the center or plane of impact of the wheel and also to have the disk cross the plane of impact as it extends radially inward from its attachment to the rim. As a consequence, the tire inflation tube, which, in standard constructions of tires is always at the center, will pass through the rim at one side of the disk and where this is on the inner side of the wheel, the tube becomes relatively inaccessible. On the other hand, if the wheel is reversed so that the inflation tube is on the outside, this produces an objectionable pocket beneath the rim for the accumulation of mud.

With the present construction, I have avoided the difficulty by so locating the disk with respect to the rim that it will cross the plane of impact within the length of the standard tire inflation tube. I also avoid interference with the brake drum, or other parts of the mechanism, by reversed dishing of the disk at a point while still within the plane of the inner edge of the rim. Still further, I preferably increase the diameter of the flange on the hub so as to diminish the distance between the same and the rim, thereby stiffening the structure and reducing the weight of the demountable part.

As shown, A is the hub which is provided with an outwardly extending flange B, to which the disk C is demountably secured. The flange B is so proportioned as to give a certain degree of flexibility and is also fashioned to form a substantially cylindrical bearing D of greater diameter than the barrel of the hub for engagement with a foot flange E on the disk. F is the brake drum which is attached to the inner face of the flange B and is preferably laterally offset in an inward direction, as indicated at G, so as to provide greater clearance for the dished portion of the disk.

The disk C is formed with a portion H lying in a plane parallel to the outer portion of the flange B and surrounding the portion H is a reverse curved portion I which merges into the oblique portion J extending to the rim. The cross-section of the metal is preferably tapered from a maximum in the portion H to a minimum at the point of attachment to the rim. Also, there is preferably provided a cylindrical flange portion K fitting within the rim and forming a reinforcement therefor, said portion terminating in an outwardly rounding portion L, which conforms to the shape of the base of the rim flange.

M is a rim of any suitable construction. Where this rim is provided with a detachable flange, this flange is arranged on the inner side of the wheel, being provided with the usual return-bent portion N, which forms an obliquely extending groove for receiving the split flange O. The portion N constitutes a reinforcement or stiffening member for the inner side of the rim, while the outer side of the rim is reinforced and stiffened by the portions K and L of the disk in conjunction with the portion J thereof.

For the passage of the tire inflation tube, the rim M is apertured and a registering aperture is formed in the portion J of the disk. A guide tube P is preferably placed in these registering apertures, said tube being restricted in length so that the end of the tire inflation tube will project therebeyond in a position accessible from the front of the wheel. This tube is preferably inclined slightly from the plane of the wheel so as to shorten the length of aperture in the disk through which it passes.

The disk is demountably secured upon the hub by any suitable means of attachment, such as the studs or screws Q, engaging threaded apertures in the flange B and the annular clamping plate R, which is secured by said screws.

Figure 4:
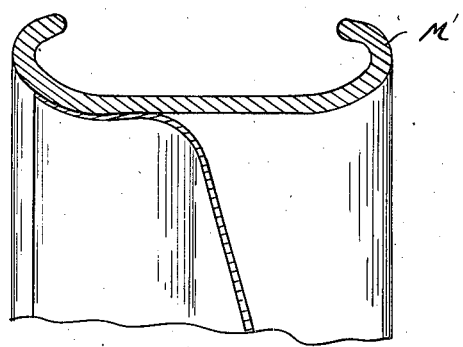
Figure 4 is a view similar to Figure 3 showing a modified construction.

The modified construction shown in Figure 4 is similar to that shown in Figure 3, with the substitution of a clincher type of rim M' for the detachable flange rim M.

With the construction as described, the weight of the demountable portion of the wheel is reduced to the minimum, which facilitates change of tires. Inasmuch as the wheel is demounted before the tire is disengaged from the rim, the removable flange O can be arranged upon the inner side of the rim without inconvenience. This has the advantage that the marring of the finish, which is unavoidable in frequently removing and replacing the flange, is not as noticeable as where such flange is at the front of the wheel. Also, the return-bent portion, which forms the groove for receiving the detachable flange, will reinforce the rim on one side, while the attachment to the disk will reinforce it on the other side, thereby balancing the one against the other. The accessibility of the tire inflation tube from the front of the wheel is a great convenience and permits of using standard equipment in tires.

What I claim as my invention is:

1. The combination with a rim, of a dished disk secured to said rim and passing obliquely inward therefrom to cross the plane of impact within the length of the tire inflation tube, said disk being reversely dished in its inner portion to extend back to the plane of impact.

2. The combination with a rim, of a dished disk having a portion for fitting the inner face of said rim, a portion extending obliquely inward to cross the plane of impact within the length of the tire inflation tube, a reversely dished portion for returning to the plane of impact, and a portion substantially in the plane of impact for demountably securing to the hub.

3. The combination with a rim, of a dished disk having a peripheral portion fitting within the outer side of said rim and reinforcing the same, an obliquely and radially inwardly extending portion crossing the plane of impact within the length of the tire inflation tube, a reversely dished portion returning to the plane of impact, a portion substantially in and parallel to the plane of impact for securing to the hub, and a substantially straight tubular guide for the tire inflation tube passing through said rim and disk and inclining slightly to the plane of impact.

4. The combination with a rim having a return-bent portion at one side thereof, forming a channel for receiving a detachable flange, of a dished disk having a flange fitting within the opposite side of said rim to reinforce the same and to balance the reinforcement of said bent portion.

5. The combination with a rim having an integral flange at one side thereof and an inwardly extending and return-bent portion at the opposite side forming a channel for receiving a detachable flange and also a reinforcement for said side of the rim, of a dished disk having a flange fitting within the rim on the side opposite said return-bent portion to reinforce said side and to balance the same with the reinforcement of the return-bent portion.

6. The combination with a rim having an integral flange at one side thereof and an inwardly extending return-bent portion at the opposite side forming a channel for receiving a detachable flange, of a dished disk having a flange fitting within the portion of said rim on the side having the integral flange and also having an obliquely radially inwardly extending portion which crosses the plane of impact within the length of the tire inflation tube, and a portion return-bent to the plane of impact, terminating in a portion for securing to the hub.

7. The combination with a rim having a cylindrical portion, an outwardly extending integral flange at one side thereof and an inwardly extending return-bent cross-section at the opposite side thereof forming a channel for receiving the detachable flange, a hub having a flange adjacent to the plane of impact, a brake drum having a flange, the inner portion of which is secured to said flange on the hub and having an offset portion extending radially outward to the drum, and a dished disk secured to said rim having a portion extending obliquely inward and crossing the plane of impact within the length of the tire inflation tube, said portion extending adjacent to the offset flange of said brake drum, and a return-bent portion extending to the plane of impact and terminating in a portion for securing to said flange of the hub.

8. The combination with a rim and a hub, of a flange on said hub having portions extending radially outward in two planes, connected by a laterally extending portion forming a cylindrical bearing of greater diameter than the barrel of the hub, and a dished disk extending from said rim to said hub, said disk having an obliquely extending portion crossing the plane of impact within the length of the tire inflation tube, a portion return-bent to the plane of impact, and a portion for securing to said flange seated upon said cylindrical bearing of the hub flange.

9. The combination with a rim and a hub, of a flange extending radially outward from said hub on one side of the plane of impact, then laterally to cross the plane of impact, and then radially outward, a dished disk for connecting said hub and rim having a portion seated upon said laterally extending portion of the hub flange and detachably secured to the portion of said flange extending outward therefrom, said disk having an obliquely extending portion crossing the plane of impact within the length of the tire inflation tube, and a portion return-bent to the plane of impact, terminating in said portion for connecting to the hub.

10. The combination with a rim having an inwardly offset seat at one side thereof for receiving a detachable flange, of a dished disk having a flange fitting within the opposite side of said rim to reinforce the same and to balance the reinforcement of said offset seat.

11. The combination with a rim having an inwardly offset seat at one side thereof for receiving a detachable flange, of a dished disk fitting within and secured to the opposite side of said rim to reinforce the same and to balance the reinforcement of said offset seat.

In testimony whereof I affix my signature.

ALDEN L. PUTNAM.